United States Patent
Bedingfield, Sr. et al.

(10) Patent No.: US 9,129,030 B2
(45) Date of Patent: *Sep. 8, 2015

(54) SUBSTITUTE UNIFORM RESOURCE LOCATOR (URL) GENERATION

(75) Inventors: James Carlton Bedingfield, Sr., Lilburn, GA (US); John Martin Gehl, Canton, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 354 days.

This patent is subject to a terminal disclaimer.

(21) Appl. No.: 13/558,731

(22) Filed: Jul. 26, 2012

(65) Prior Publication Data

US 2012/0290923 A1 Nov. 15, 2012

Related U.S. Application Data

(63) Continuation of application No. 11/290,074, filed on Nov. 30, 2005, now Pat. No. 8,255,480.

(51) Int. Cl.
*G06F 17/00* (2006.01)
*G06F 17/30* (2006.01)
*H04L 29/12* (2006.01)

(52) U.S. Cl.
CPC .... *G06F 17/30887* (2013.01); *H04L 29/12594* (2013.01); *H04L 29/12943* (2013.01); *H04L 61/301* (2013.01); *H04L 61/6072* (2013.01)

(58) Field of Classification Search
CPC .......... G06F 17/30887; G06F 17/3089; G06F 17/2235; G06F 17/30882
USPC .......................................... 715/234
See application file for complete search history.

(56) References Cited

U.S. PATENT DOCUMENTS

| | | |
|---|---|---|
| 5,835,718 A | 11/1998 | Blewett |
| 6,578,078 B1 | 6/2003 | Smith et al. |
| 6,732,179 B1 | 5/2004 | Brown et al. |
| 6,772,214 B1 | 8/2004 | McClain et al. |
| 6,917,961 B2 | 7/2005 | Melet et al. |
| 7,293,012 B1 | 11/2007 | Solaro et al. |
| 7,698,442 B1 | 4/2010 | Krishnamurthy et al. |
| 8,255,480 B2 | 8/2012 | Bedingfield, Sr. |
| 2002/0120648 A1* | 8/2002 | Ball et al. ...................... 707/511 |
| 2004/0248558 A1* | 12/2004 | Chandhok .................. 455/412.1 |
| 2004/0258044 A1 | 12/2004 | Girouard et al. |

(Continued)

OTHER PUBLICATIONS

"SnipURL.com," archive of 2004, available at web.archive.org ("SnipURL"), pp. 1-16.*

(Continued)

*Primary Examiner* — Kativa Padmanabhan
*Assistant Examiner* — Andrew McIntosh
(74) *Attorney, Agent, or Firm* — Hartman & Citrin LLC

(57) ABSTRACT

Methods of generating a substitute URL are disclosed. In one implementation, a form is presented by a web server on a web site home page for the submission of a first URL for which a user wishes to generate an alias URL. A second URL is then generated for the URL that is entered in the form. The second URL contains some indication of the web site that hosts the first URL. In a second implementation the substitute URL generation is offered through a link or button on a web page other than the web site home page. The substitute URL is generated for the URL for the web page that hosts the link. In a third implementation, a web site automatically generates substitute URLs.

19 Claims, 11 Drawing Sheets

(56) References Cited

U.S. PATENT DOCUMENTS

| | | |
|---|---|---|
| 2005/0015626 A1 | 1/2005 | Chasin |
| 2005/0055708 A1* | 3/2005 | Gould et al. ............... 725/25 |
| 2006/0070022 A1 | 3/2006 | Ng et al. |
| 2006/0080257 A1 | 4/2006 | Vaughan et al. |
| 2006/0123095 A1 | 6/2006 | Kate et al. |
| 2006/0253458 A1 | 11/2006 | Dixon et al. |
| 2006/0253533 A1 | 11/2006 | Bursztein et al. |
| 2006/0253578 A1 | 11/2006 | Dixon et al. |
| 2006/0253581 A1 | 11/2006 | Dixon et al. |
| 2006/0253583 A1 | 11/2006 | Dixon et al. |
| 2006/0253584 A1 | 11/2006 | Dixon et al. |
| 2006/0253586 A1 | 11/2006 | Woods |
| 2007/0067297 A1 | 3/2007 | Kublickis |
| 2007/0078936 A1 | 4/2007 | Quinlan et al. |
| 2007/0124414 A1 | 5/2007 | Bedingfield |
| 2007/0124499 A1 | 5/2007 | Bedingfield |
| 2007/0124500 A1 | 5/2007 | Bedingfield |
| 2008/0109473 A1 | 5/2008 | Dixon et al. |
| 2008/0114709 A1 | 5/2008 | Dixon et al. |
| 2012/0023390 A1 | 1/2012 | Howes et al. |
| 2012/0324327 A1 | 12/2012 | Vishria et al. |

OTHER PUBLICATIONS

U.S. Office Action dated Sep. 24, 2008 in U.S. Appl. No. 11/290,074.
U.S. Office Action dated Feb. 25, 2009 in U.S. Appl. No. 11/290,074.
U.S. Office Action dated Jun. 10, 2009 in U.S. Appl. No. 11/290,074.
U.S. Office Action dated Dec. 18, 2009 in U.S. Appl. No. 11/290,074.
TinyURL.com [archive of Dec. 27, 2003], available at web.archive.org].
"Lookleap" [archive of Oct. 29, 2005], available at web.archive.org] 3 pages.
kxk.me, Free URL Shortener, May 21, 2011.
TinyURL.com, TinyURL was created!, May 21, 2011.
TinyURL.com [archive of Oct. 28, 2005], available at web.archive.org].
U.S. Office Action dated Dec. 12, 2012 in U.S. Appl. No. 11/290,356.
Notice of Allowance mailed Jul. 5, 2013, in U.S. Appl. No. 11/290,356.
Bedingfield; Final Office Action mailed May 11, 2010 for U.S. Appl. No. 11/290,356, filed Nov. 30, 2005.
Bedingfield; Final Office Action mailed May 27, 2011 for U.S. Appl. No. 11/290,356, filed Nov. 30, 2005.
Bedingfield; Final Rejection mailed Mar. 24, 2009 for U.S. Appl. No. 11/290,356, filed Nov. 30, 2005.
Bedingfield; Non-Final Office Action mailed Dec. 15, 2010 for U.S. Appl. No. 11/290,356, filed Nov. 30, 2005.
Bedingfield; Non-Final Rejection mailed Oct. 3, 2008 for U.S. Appl. No. 11/290,356, filed Nov. 30, 2005.
Bedingfield; Non-Final Rejection mailed Oct. 14, 2009 for U.S. Appl. No. 11/290,356, filed Nov. 30, 2005.
Bedingfield; U.S. Appl. No. 11/290,356, filed Nov. 30, 2005.
Bedingfield; Final Office Action mailed May 20, 2011 for U.S. Appl. No. 11/290,074, filed Nov. 30, 2005.
Bedingfield; Non-Final Office Action mailed Apr. 15, 2010 for U.S. Appl. No. 11/290,074, filed Nov. 30, 2005.
Bedingfield; Non-Final Office Action mailed Oct. 31, 2011 for U.S. Appl. No. 11/290,074, filed Nov. 30, 2005.
Bedingfield; Non-Final Office Action mailed Dec. 6, 2010 for U.S. Appl. No. 11/290,074, filed Nov. 30, 2005.
Bedingfield; Notice of Allowance mailed May 10, 2012 for U.S. Appl. No. 11/290,074, filed Nov. 30, 2005.
Bedingfield; Examiner Interview Summary mailed Dec. 4, 2008 for U.S. Appl. No. 11/290,407, filed Nov. 30, 2005.
Bedingfield; Final Office Action mailed Feb. 26, 2009 for U.S. Appl. No. 11/290,407, filed Nov. 30, 2005.
Bedingfield; Final Office Action mailed Mar. 3, 2010 for U.S. Appl. No. 11/290,407, filed Nov. 30, 2005.
Bedingfield; Interview Summary mailed May 11, 2009 for U.S. Appl. No. 11/290,407, filed Nov. 30, 2005.
Bedingfield; Non-Final Office Action mailed Sep. 17, 2010 for U.S. Appl. No. 11/290,407, filed Nov. 30, 2005.
Bedingfield; Non-Final Rejection mailed Sep. 3, 2009 for U.S. Appl. No. 11/290,407, filed Nov. 30, 2005.
Bedingfield; Non-Final Rejection mailed Sep. 18, 2008 for U.S. Appl. No. 11/290,407, filed Nov. 30, 2005.
Bedingfield; U.S. Appl. No. 11/290,407, filed Nov. 30, 2005.
Ferguson; Andrew Ferguson BLOG, www.andrewferguson.net, archive of Oct. 26, 2005, available at web.archive.org).
Ferguson; Better URL, buri.fergcorp.com (archive of Oct. 27, 2005, available at web.archive.org); 4 pages.
Novia, Access Denail/Approval by Domain http://web.archive.org/web/2002120430700/http://www.novia.net/~tomcat/HowTo/domainrestric.html.
Sniptools, SnipURL featrues list and FAQ, Jun. 11, 2004, http://web.archive.org/web/20040611070712/http://snipurl.com/.
Website: www.TinyURL.com (archive of Dec. 27, 2003, available at web archive.org); 3 pages.
"TinyURL.com", archive of Oct. 28, 2005, available at web.archive.org.
"SnipURL.com", archive of Sep. 26, 2004, available at web.archive.org,(available by clicking on the SnipURL FAQ; separated for readability into Snip 1(i.e. SnipURL FAQ>First Things First), Snip 2(i.e. SnipURL . . . see 190255-1200 NFOA of Dec. 6, 2010.
"Lookleap" source code, archive of Oct. 29, 2005, available at web.archive.org.

* cited by examiner

SUBSTITUTE UNIFORM RESOURCE LOCATOR (URL) GENERATION

CROSS-REFERENCE TO RELATED APPLICATION

This application is a continuation of U.S. utility application entitled, "Substitute Uniform Resource Locator (URL) Generation," having Ser. No. 11/290,074, now U.S. Pat. No. 8,255,480, filed Nov. 30, 2005, which is entirely incorporated herein by reference. This application is related to U.S. utility patent applications entitled "Automatic Substitute Uniform Resource Locator (URL) Generation" filed on Nov. 30, 2005 and accorded Ser. No. 11/290,407, now abandoned, and "Substitute Uniform Resource Locator (URL) Form" filed on Nov. 30, 2005 and accorded Ser. No. 11/290,356, now U.S. Pat. No. 8,595,325, which are entirely incorporated herein by reference.

TECHNICAL FIELD

The present disclosure is generally related to the Internet and, more particularly, is related to a method for generating substitute URLs.

BACKGROUND

Email has become a prolific means of sending information between people. One effective use of email is to send an internet location, or a uniform resource locator (URL), to someone so that she can visit a web page that another user finds interesting. When the user who reads this email clicks the URL, or types it into the browser, the browser automatically downloads the page at the URL. In one example, a user searches on a web site for a hard-to-find item, and the URL for the web page with the item is long due to the process used to find the item or the tree structure of the server that hosts the web page. When the user sends the URL to another user in an email communication, the URL may be very long necessitating it to be split between multiple lines. This causes problems when, in one example, two users have incompatible email programs. Often the receiving email program will not be able to read a URL that has been split by another email program.

One solution to this problem is presented by "tinyurl" at www.tinyurl.com (with a comma inserted instead of a period before "com" to prevent execution at the USPTO website, and likewise hereinafter). At www.tinyurl.com, a user can enter a URL and it generates an alias URL. However, it can be used to make a URL anonymous. For example, an unscrupulous user can send a URL for a web site with potentially objectionable content and shorten the URL down to tinyurl.com/hflk. The recipient of the tinyURL doesn't know what web site she is visiting when she clicks on the tinyURL. It could even be a web site that introduces a virus to the computer. There is no means to tell what web site the tinyURL is actually downloading. Thus, a heretofore unaddressed need exists in the industry to address the aforementioned deficiencies and inadequacies.

SUMMARY

Embodiments of the present disclosure provide a system and method for generating a substitute uniform resource locator (URL). Briefly described, in architecture, one embodiment of the system, among others, can be implemented as a webpage with hyperlinked text for prompting for the generation of a substitute URL for a first URL associated with the webpage; a server for receiving a response to the prompt from a user; and an application for generating the substitute URL.

Embodiments of the present disclosure can also be viewed as providing methods for generating a substitute URL. In this regard, one embodiment of such a method, among others, can be broadly summarized by the following steps: providing a prompt on a webpage for generating a substitute URL for a first URL associated with the webpage; receiving a response to the prompt from a user; and generating the substitute URL.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

The present disclosure will now be described in more detail with reference to the figures. An object of an exemplary embodiment, then, is to generate a substitute URL in which there is an indication of the source of the URL. For instance, in the case of BellSouth at bellsouth.com, whenever a long URL is created, a substitute URL can be generated which retains the domain name (bellsouth in this case) in the URL.

Figure 1:
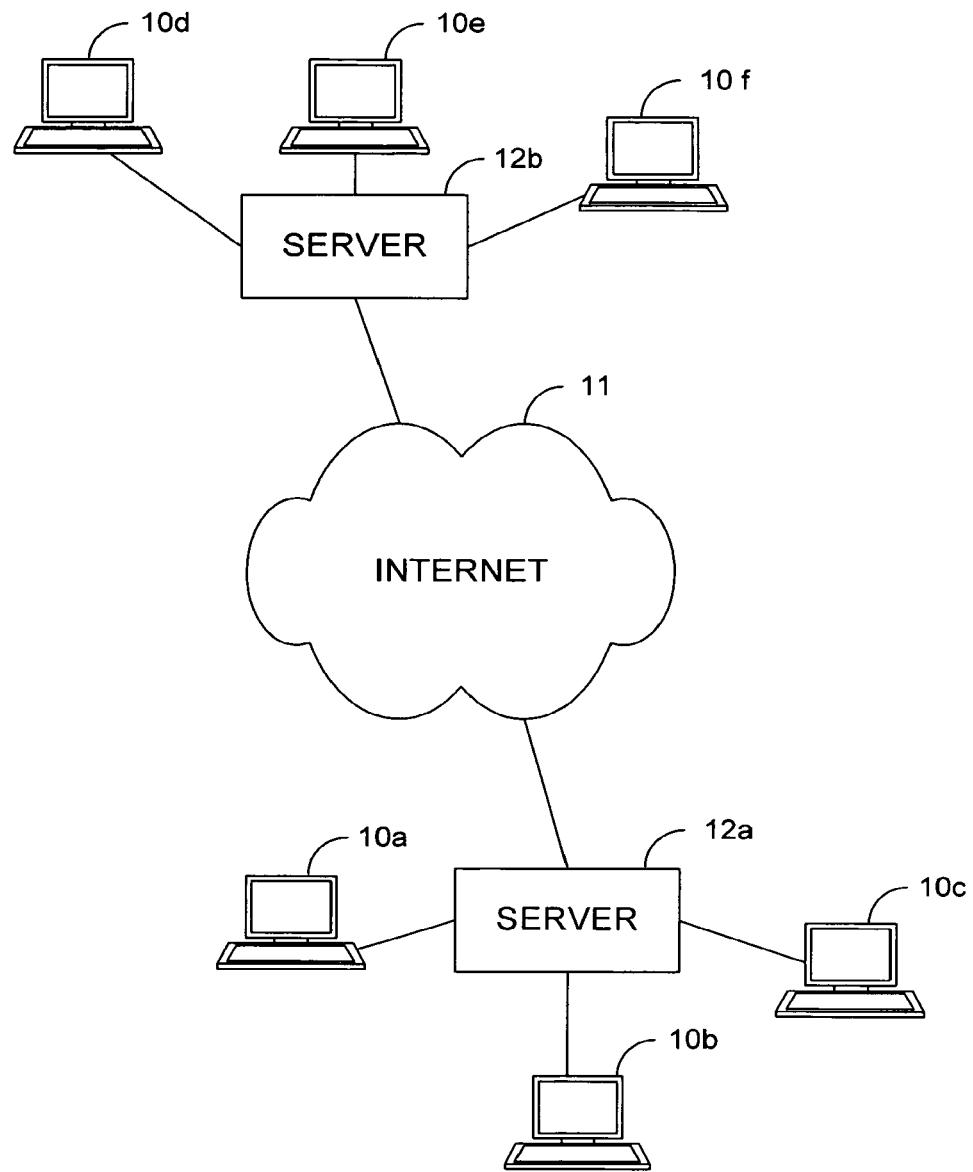
FIG. 1 is a block diagram of an exemplary embodiment, among others, of a client-server architecture used by a client computer to download information using a web browser.

Referring now to FIG. 1, shown is a block diagram illustrating an architecture used for internet browsing used in one embodiment, among others. Each of a plurality of remote computers 10a-f access the internet 11 (or other network) through a server 12a, 12b (or other gateway systems). It should be recognized by one skilled in the art that the server 12a, 12b can offer access to the internet 11 through a plethora of connection types, including a digital subscriber line (DSL) service, an integrated services digital network (ISDN) service, an analog dial-up service, ethernet, T-1, or any other service for transmitting data through a network. Each of the servers 12a, 12b, in turn, are connected to the internet 11. This internet connectivity enables the servers 12a, 12b and other servers connected to the internet to transfer information amongst the servers 12a, 12b using various universal protocols recognized by the servers.

With specific regard to browsing, the servers 12a, 12b generally include at least a hypertext transfer protocol (HTTP) server. Typically, the browser on computers 10a-f uses HTTP to make requests of web servers throughout the Internet on behalf of a browser user. Also, the browser on computers 10a-f include a hyper text markup language (HTML) interpreter which renders the HTML code into a visual web page in the browser window.

Servers 12a, 12b may host nefarious or legitimate content. A user of a server with nefarious content may try to acquire a substitute URL to lure other unwitting users to his site. A user of a server with legitimate content may acquire a substitute URL for ease of use, among other reasons.

Figure 2:
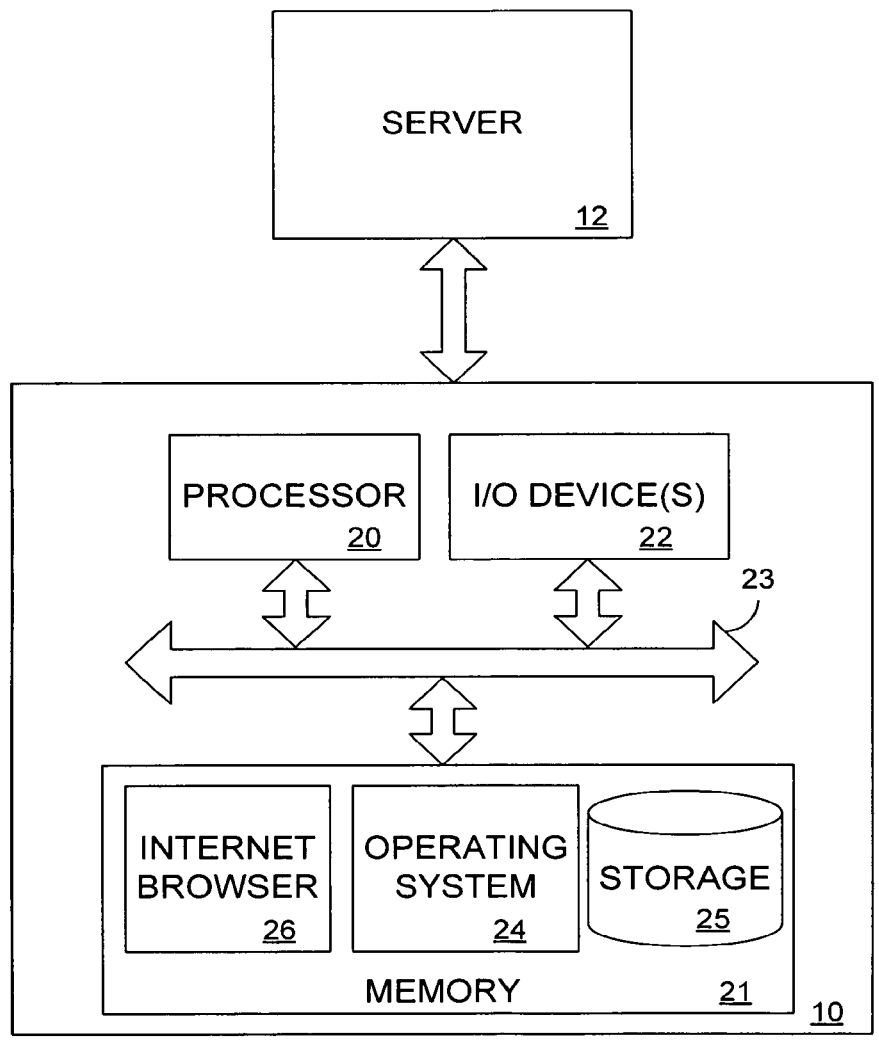
FIG. 2 is a block diagram of an exemplary embodiment, among others, of the client computers of FIG. 1, including the browser used in the present disclosure.

Referring now to FIG. 2, shown is a block diagram of an embodiment of a computer system. As known to those skilled in the art, a computer system typically includes a processor 20, memory 21 and input/output (I/O) device(s) 22, all communicating over a bus 23. The memory 21 typically includes an operating system 24 and non-volatile storage 25. The operating system 24 is typically stored in non-volatile memory while the computer 10 is turned off, and loaded into volatile memory upon start-up, where it can be executed by the processor 20. In the present embodiment, the memory 21 includes a browser 26 which enables the computer to view internet web pages on server 12 through an I/O device 22 such as an analog modem, DSL modem, ISDN modem or ethernet card, among others.

Figure 3A:
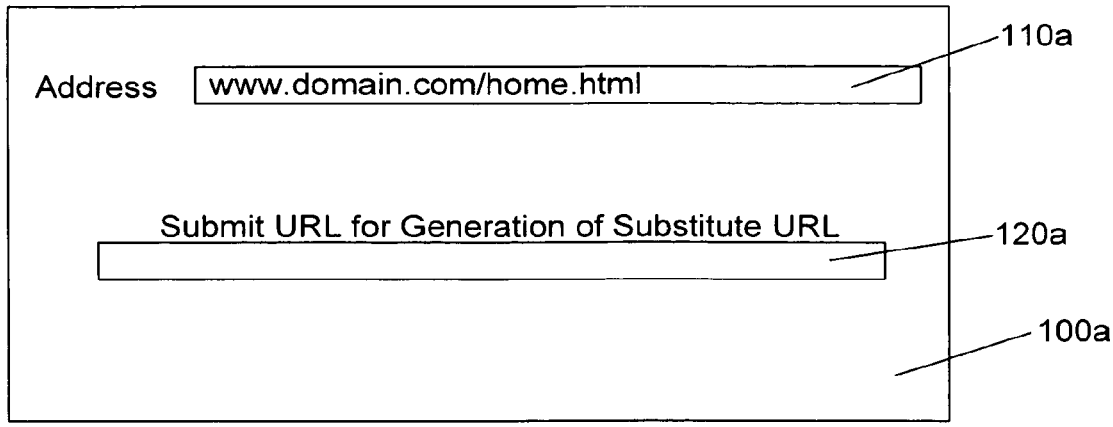
FIGS. 3A-3C are diagrams of exemplary embodiments of a web page with a form for generating a substitute URL.

In one embodiment, a user visits a web site with a lengthy address. As provided in FIG. 3A, a web site offers a service for generating a substitute URL on the home page of the web site. Browser window 100a provides an address bar 110a presenting the URL of the web page. Form 120a is included on the home page for a user to submit a URL for substitute generation. This web site offers a service that may be domain or web site specific. Regarding limiting the service to a web site as opposed to a domain, this substitute URL generator embodiment can be limited for use to one or more of several individual web sites housed within a domain such as AOL® or Angelfire®, for instance. The service can be made to be only available for URLs that correspond to that domain or web site. It may only be made available to the corresponding domain or web site. A dynamically generated URL may not contain an address on a web site, but it may point to an element on some page within the web site. To achieve this function, in an exemplary embodiment, a filter can be implemented that prevents a user from receiving a substitute URL for a web site outside of a particular domain. This implementation is domain or web site specific. Other industry implementations do not appear to have any limitations on the URLs that are accepted for substitute generation. For example, at www.tinyurl.com, any URL from any web site can be entered, and a substitute URL will be generated for it.

In one embodiment the validity of the URL that is entered is verified. There can be an option such that the web page entered in form 120a is verified before a shortened URL is supplied. In an exemplary embodiment, a server can determine if there is a 404 error when the web site is accessed. A 404 error is a standard response code of HTTP notifying a user that the web page at the entered URL can not be found.

This could be implemented on any web server. This could be an application that is run at a server level, or scripts can be passed down through the web page which could generate the substitute URL as a request. Although the server is generally involved in creating any shortened URL, the level of the server's involvement could vary. Either the server could do all of the processing work creating the URL or some of the creation could be embodied in a script or Java code in the web page where the substitute URL is created.

One problem that might be encountered involves invalid web site URLs. For instance, if a URL that includes data is entered it may be valid at that time, but it may not be valid at some later date. In this case, a validation can be performed when the substitute URL is generated, and then the service can periodically check through the list of shortened URLs that were assigned to verify that it remains valid. In an exemplary embodiment, a database may be maintained to keep record of the generated substitute URLs. Otherwise, there could be a nefarious attempt to crash a system through the submission of a large number of invalid URLs.

Figure 3B:
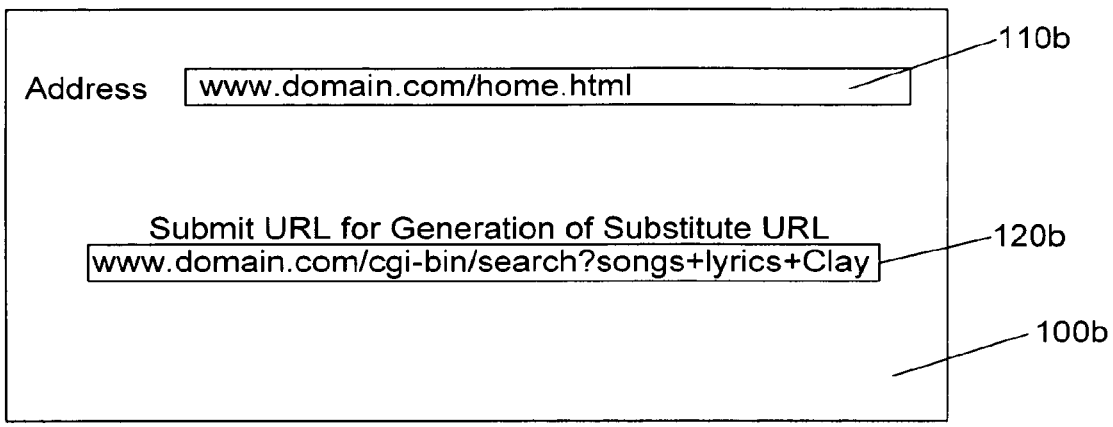
Figure 3C:
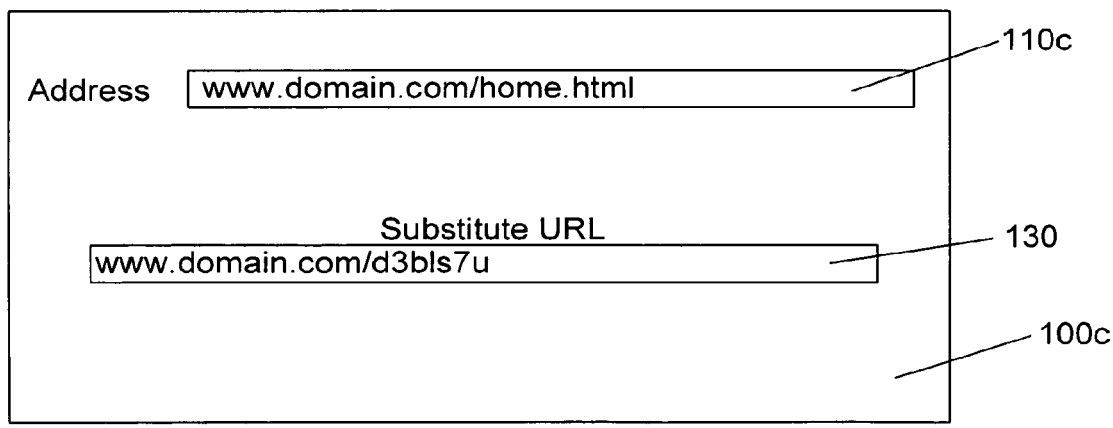

Referring to FIG. 3b, one implementation of an exemplary embodiment is performed by copying (perhaps by cut and paste) a URL into form 120b located on a domain or web site home page 100b. A user can enter a lengthy URL in form 120b and, as shown in FIG. 3C, receive a shortened URL 130 in return. In this embodiment, form 120b is not part of every web page; it is available on the home page 100 of that domain or web site. A user can copy a URL of a web page on a domain, go to the home page 100 of that domain, and paste the longer URL into form 120. Then, perhaps after clicking a submit button, or through some other similar entry indicator, the substitute URL 130 is generated and presented to the user, for example, in a link including an indication of the domain that hosts the web page at the URL. The user can then save the substitute URL, bookmark it, etc.

Figure 4:
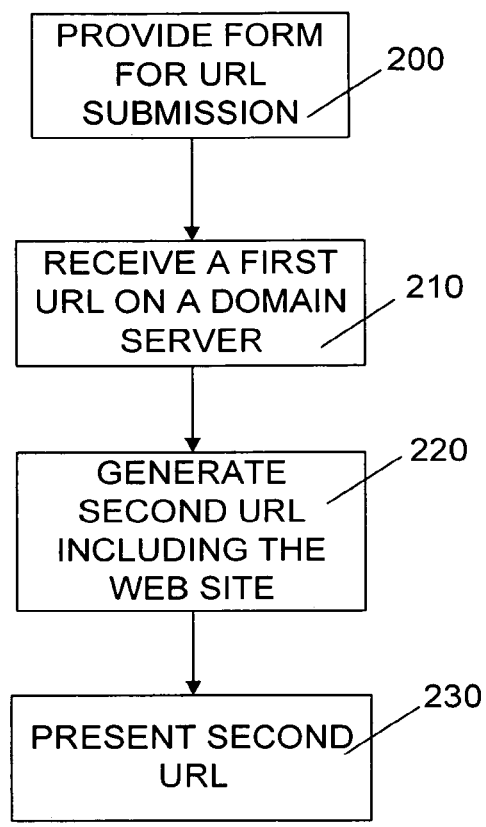
FIG. 4 is a flow chart of an exemplary embodiment of a method for generation of a substitute URL as provided on the web page of FIG. 1.
Figure 5:
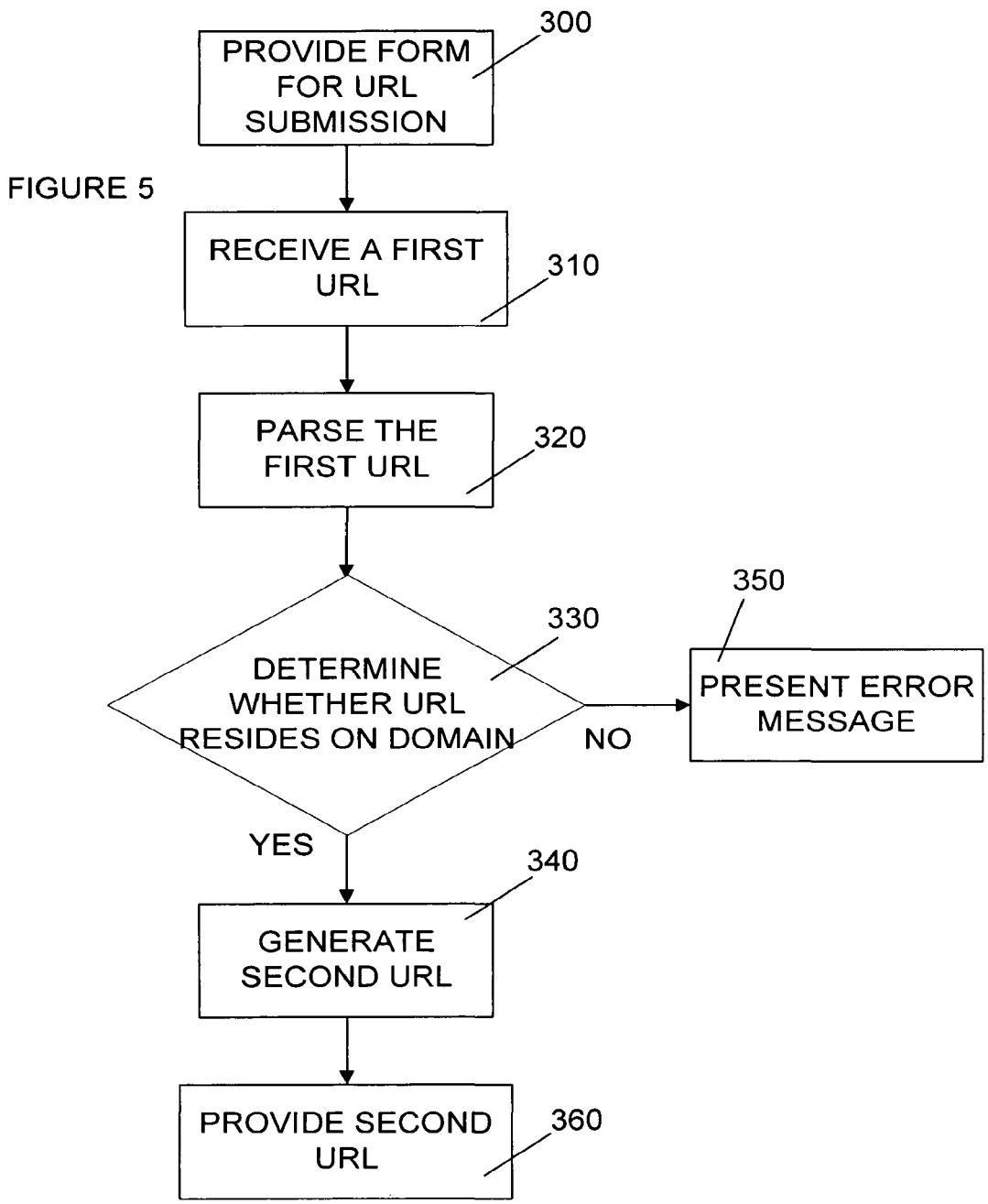
FIG. 5 is a flow chart of an exemplary embodiment of a method for generation of a substitute URL with parsing as provided on the web page of FIG. 1.

FIG. 4 and FIG. 5 provide flow diagrams for implementations of exemplary embodiments of a form for generating a substitute URL. Referring to FIG. 4, in block 200, a web server provides a form on a web site for the submission of a URL by a user. In block 210, the web server receives a URL that a user inputs into the submission form on the web site. In block 220, the web server generates a second or substitute URL, which includes the web site as part of the second URL. In block 230, the second URL is presented to the user.

Referring to FIG. 5, in block 300, a web server provides a form for the submission of a URL by a user. In block 310, the web server receives a URL that a user inputs into the submission form. In block 320, the web server parses the first URL to determine the home page corresponding to the URL. In block 330, the web server determines if the first URL is for a web page that resides within an allowed web site by comparing the home page parsed from the URL with the home page that contains the submission form. In block 340, if the URL is for a web page that resides within the allowed web site, a second or substitute URL is generated. If the URL is not for a web page that resides within the allowed web site, an error message may be presented to the user in block 350. In block 360, the second URL is presented to the user.

Figure 6:
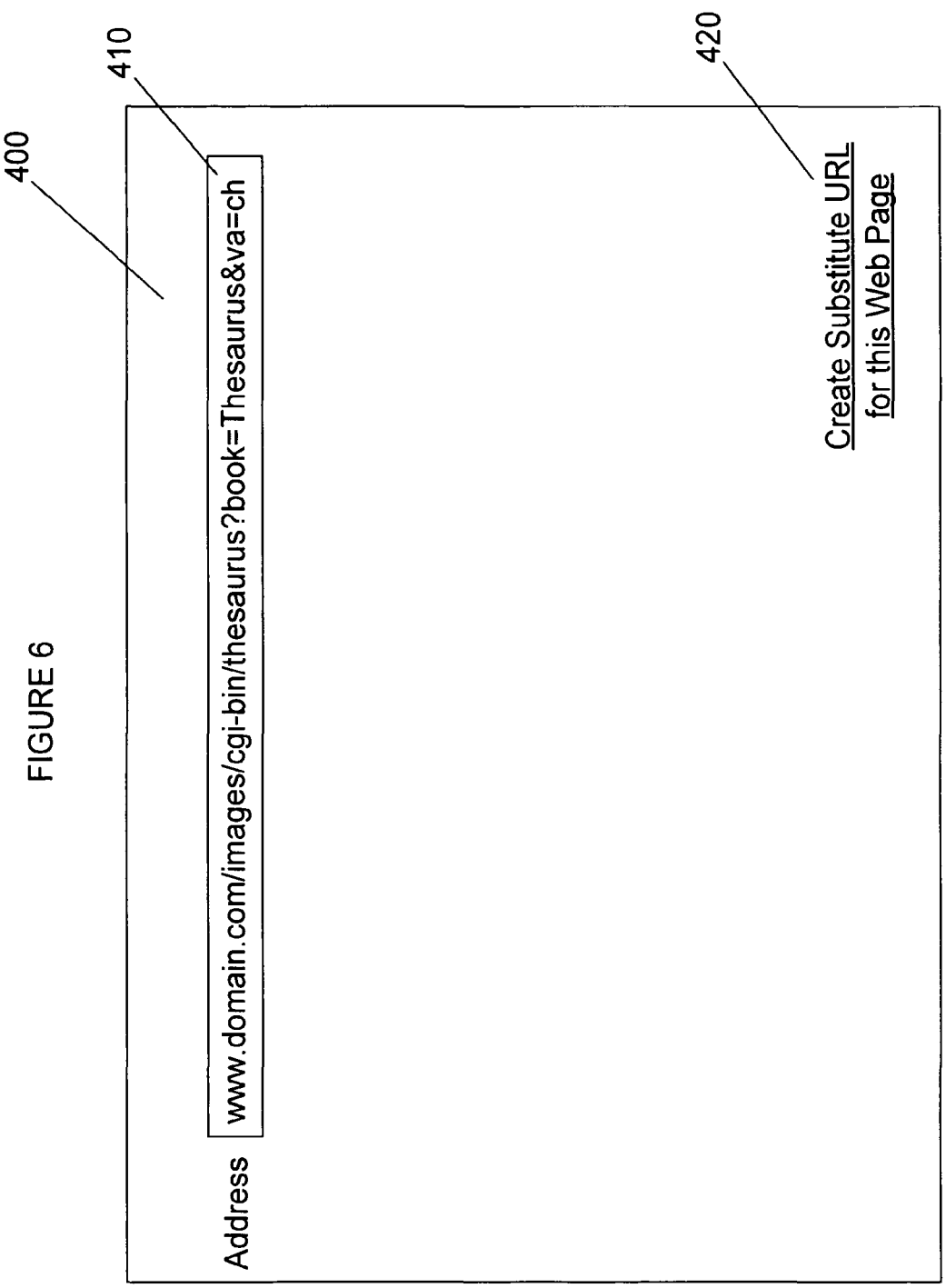
FIG. 6 is a diagram of an exemplary embodiment of a web page with a prompt for generating a substitute URL.

In another exemplary embodiment, as provided in FIG. 6, a button or link 420 for generating a substitute URL is implemented on at least one page 400 other than the home page of the web site. The URL provided in address bar 410 can be very long. For instance, a search may be performed in which a large amount of information is entered. As an example, a user visits the web site of an automotive parts dealer to find a car part. The user may click through several levels before finding the actual part, answering questions such as: What year is the car? The model? The make? What part? The user is drilling down through a database. When the part is found, the page with the part may have a considerably long URL corresponding to the database tree structure. Or, in another example, the URL could be a dynamically generated URL as the result of a search. In this embodiment, the web page can contain a link, a button or some other indicator 420 for creating a substitute URL. When the user clicks on the button 420, for example, a substitute URL is generated which is shorter than the original and contains an indication of the home web site. As the link or button 420 is on page 400 on the web site, there is no need to verify that the page 400 is on the web site as in the embodiment of FIG. 3 in which the URL is copied into form 120.

In an alternative embodiment, a selection for generating a substitute URL is available in a pull-down menu. In one implementation, the pull-down menu can be accessed by right-clicking on the URL in the address bar of the browser. In an alternative embodiment of this implementation, the substitute URL generation function can be implemented in a plug-in in even non-browser applications. The substitute URL generation function can be a selection in a pull-down menu, which can be accessed by right clicking on a URL in programs such as Microsoft Outlook®, Microsoft Word®, Wordperfect®, and Adobe Acrobat®, among others.

The presentation of the URL in many implementations can be performed in multiple ways. In one implementation, the link or button for initiating the substitute generation can be replaced with the substitute URL. Alternatively, the URL doesn't replace the link or button. Instead it is presented on the page as well as the link or button. Another implementation presents the substitute URL on another web page such as a results page. The results page may include text such as "Thank you for your entry. Here is your substitute URL:"

Figure 7:
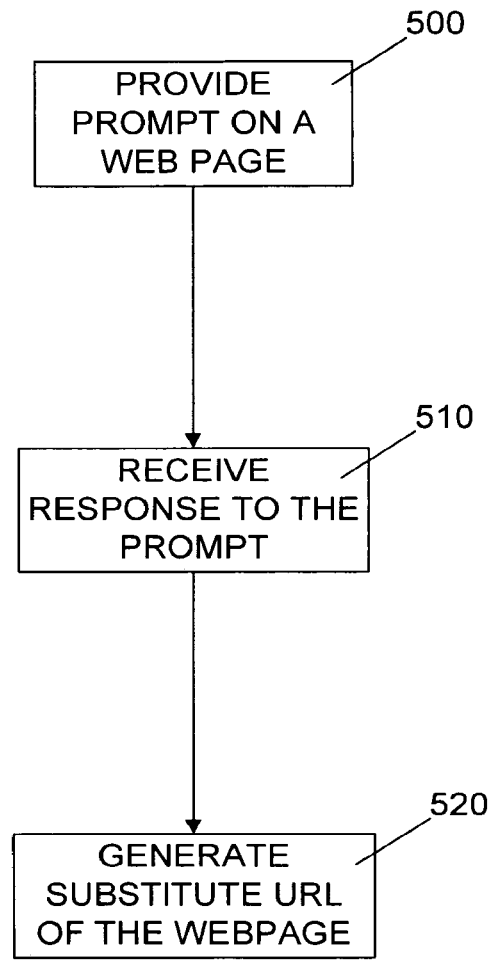
FIG. 7 is a flow chart of an exemplary embodiment of a method for generation of a substitute URL as provided on the web page of FIG. 2.

FIG. 7 presents a flow diagram of an exemplary embodiment for generating a substitute URL for the URL in the address bar with a link as provided in FIG. 6. Referring to FIG. 7, in block 500 a prompt for the generation of a substitute URL is provided on a web page. In block 510, a response to the prompt is received. In block 520, a substitute URL is generated.

Figure 8:
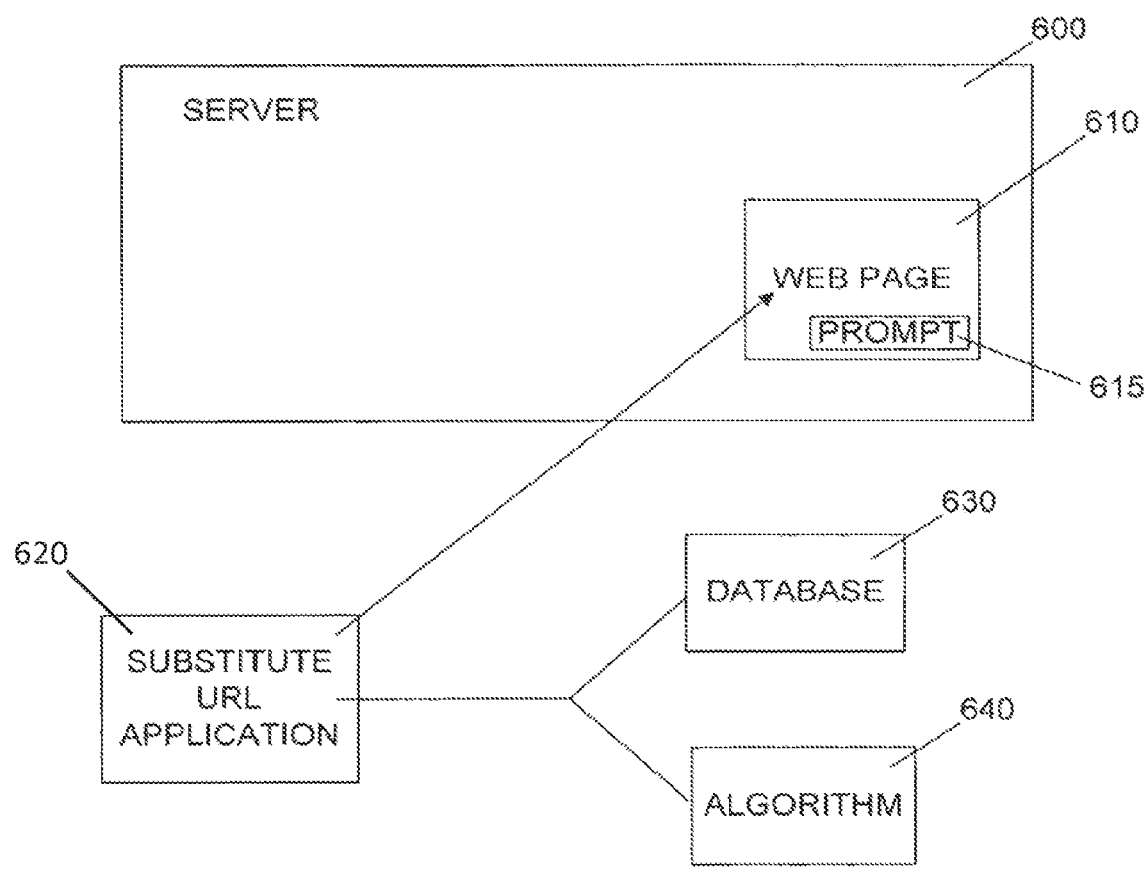
FIG. 8 is a block diagram of an exemplary embodiment of a system for automatically generating a substitute URL.

FIG. 8 presents a system block diagram of an exemplary embodiment for generating a substitute URL for the URL in the address bar with a link as provided in FIG. 6. Referring to FIG. 8, web page 610 is hosted by server 600. Web page 610 includes prompt 615, which a user selects to initiate the generation of a substitute URL. When a user selects prompt 615, substitute URL generation application 620 generates a substitute URL. The substitute URL has some indication of the web site that hosts the web page. Substitute URL generation application 620 may generate a substitute URL by one of several sub-applications, including a database application 630 and an algorithm based application 640, among others. In database application 630, a database is maintained with unique substitute URLs. When a user indicates that she wants to generate a substitute URL, or, in the automatic implementation, as described in detail below, when a user visits a web page that doesn't already have a substitute URL assigned, the server selects a substitute URL from the database. In one embodiment, the substitute URL is linked in the database to the web page that it is being substituted for so that the same substitute URL can be used for that web page each time a substitute URL is requested for it. Alternatively, a new substitute URL can be selected from the database every time a user indicates a desire for a substitute URL.

With algorithm application 640, an algorithm is implemented in which a substitute URL can be generated using a key, for example. It may include an iterative process with a multiplier or some other altering factor to create a unique substitute URL.

In another exemplary embodiment, the substitute URL generation is performed on a web server without user intervention. The web server can automatically shorten a web site's URLs. In one embodiment, before the URL is presented, the web server abbreviates the URL and then presents it in the address bar of the browser in place of the actual location. The user may never see the actual URL. An algorithm for generating the shortened URL as part of this implementation could check to see if a shortened URL had already been generated for that page. A unique URL can be generated for each visit by any user, but it is not necessary. Any hyperlink that can bring a user to another page can be shortened, and the shortened URL can be used as the hyperlink. So, in one embodiment when a user clicks on that shortened URL, the shortened URL appears in the location bar. The shortened URL appears in the address bar in one implementation, but the actual URL may be presented in the location bar in another embodiment. In this case, the substitute URL is presented in some other manner on the web page.

One advantage of the automatic generation embodiment with the shortened URL in the location bar is that the tree structure is hidden from users. Another advantage is that sensitive data that may be included in the string, such as a password, for example, may be hidden.

It is not necessary to implement the automatic substitute generator for every URL. It may be desirable to only generate substitute URLs for certain web pages, for example, pages with URLs longer than twenty characters. The generation algorithm can only automatically generate a substitute URL for URLs that include more than 20 characters. This could be implemented on any web server. This could be an application that is run at a server level, or scripts can be passed down through the web page, which could generate the substitute URL as a request. Although the server is generally involved in creating any shortened URL, the level of the server's involvement could vary. Either the server could do all of the processing work creating the URL or some of the creation could be embodied in a script or Java code in the web page where the substitute URL is created. The script can verify that the generated substitute URL is a unique URL and that the substitute URL that it generates has not already been used. But the script, for example, can create something of its own and send that back to the server.

Figure 9:
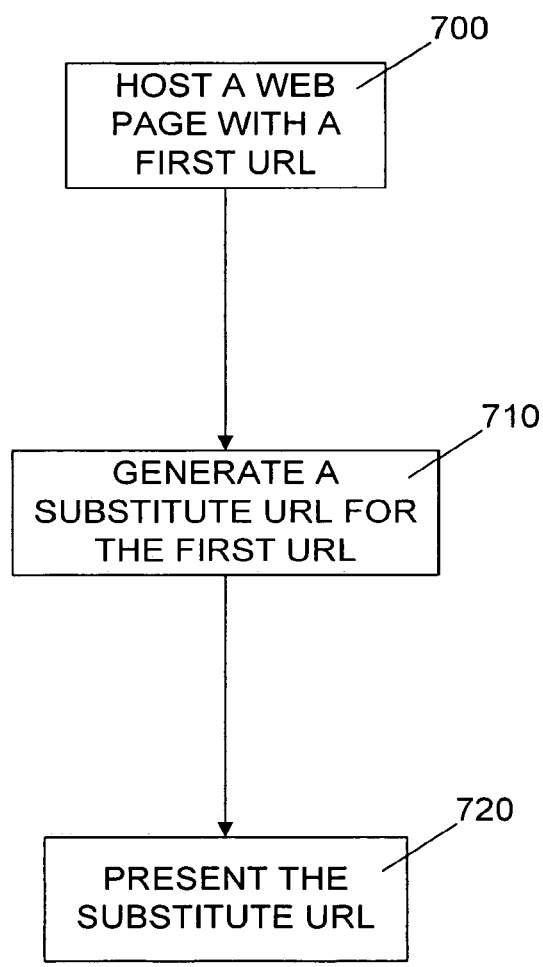
FIG. 9 is a flow chart of an exemplary embodiment of a method for generation of a substitute URL as provided in the system of FIG. 6.

FIG. 9 presents a flow diagram of an exemplary embodiment for the automatic generation of a substitute URL. In block 700, a web site hosts a web page with a first URL. In block 710, an application generates a substitute URL for the first URL. The application may be hosted on the web site, on the server that hosts the web site, or on an entirely different server. In block 720, the web page presents the substitute URL. The substitute URL may be presented in the address bar, or it may be presented as an alias in some other location on the web page.

Figure 10:
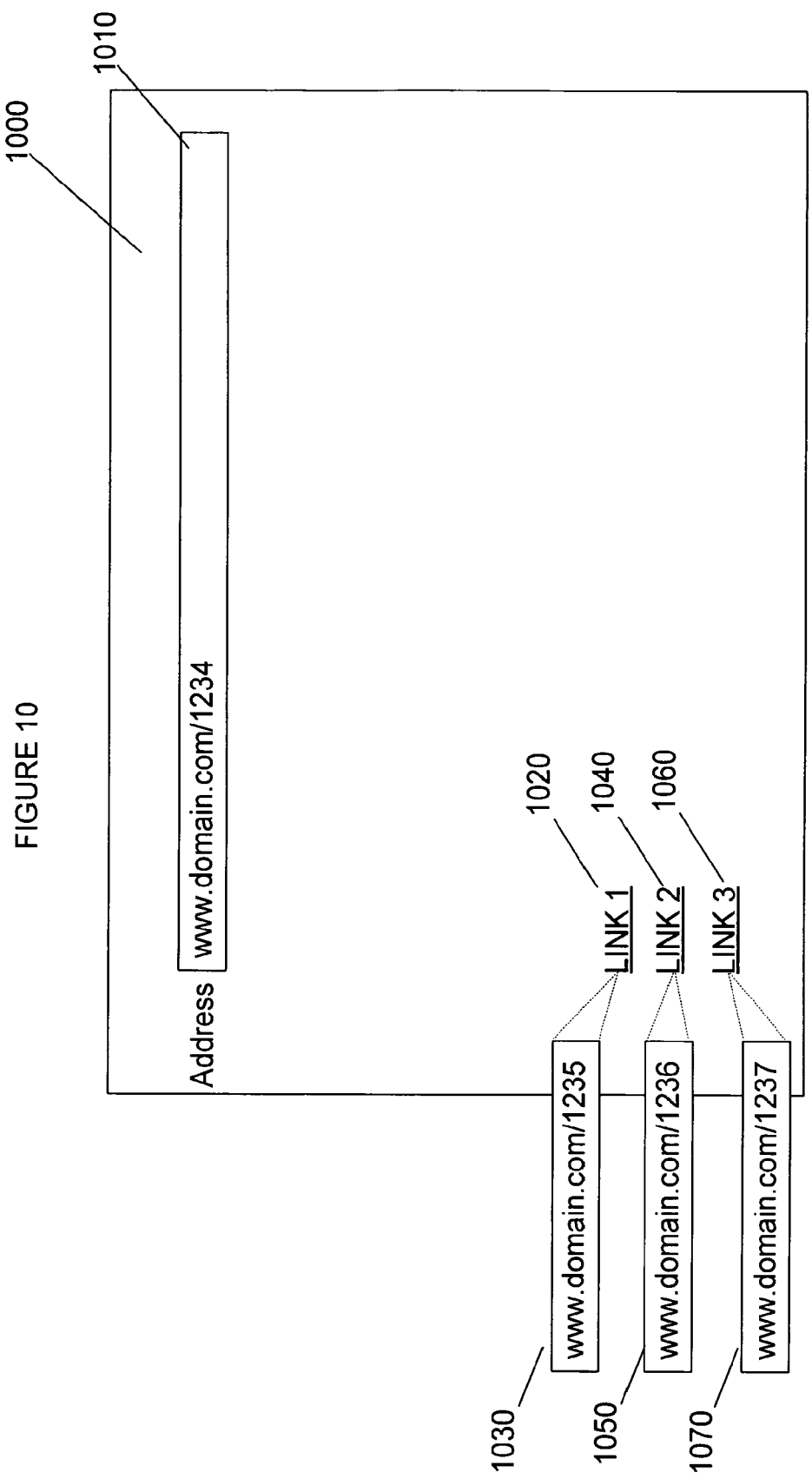
FIG. 10 is a diagram of an exemplary embodiment of a web page with automatically generated substitute URLs.

FIG. 10 presents an exemplary embodiment of a web page 1000 using automatic substitute URL generation. Web page 1000 contains address bar 1010. The automatically generated substitute URL is presented in address bar 1010. Also included on web page 1000 are links 1020, 1040, 1060. When passing a pointer, for example over one of links 1020, 1040, 1060, the corresponding substitute URL 1030, 1050, 1070 is presented.

Figure 11:
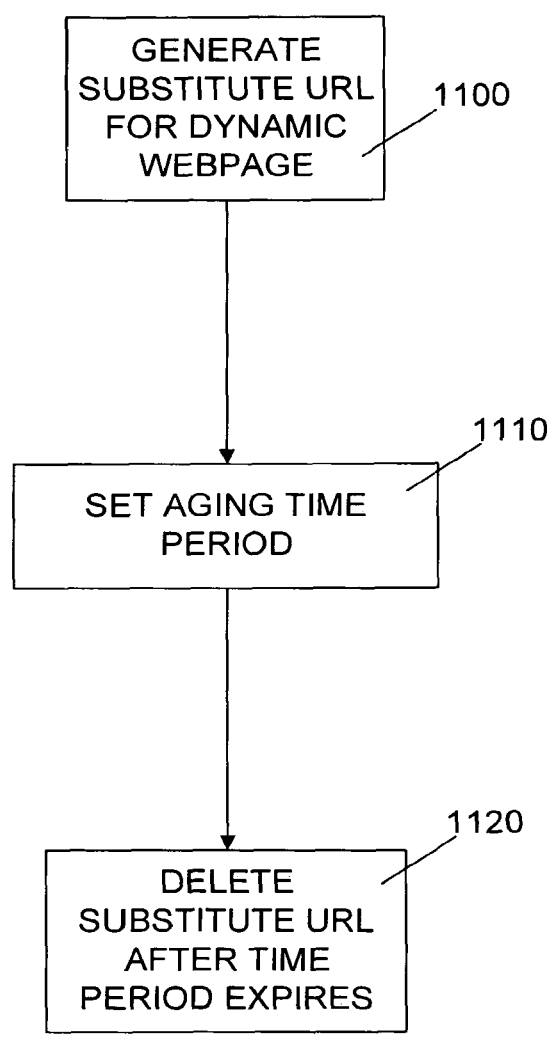
FIG. 11 is a flow chart of an exemplary embodiment of deleting substitute URLs of dynamic web pages after a time period.

Referring to FIG. 11, if a substitute URL is generated for a dynamically generated web page such as the nonlimiting example of the results of a search, the dynamically generated web page may change. When a substitute URL for a dynamically generated web page is no longer valid, the substitute URL is likewise invalid. To clean up invalid links, an aging processor deletes substitute URLs after a time period. The time period may be predetermined or it may be set by the user or a system administrator. In block 1100, a substitute URL is generated for a dynamic web page. In block 1110, an aging time period is set. The aging time period may be set universally for all substitute URLs in a web site, set for each individual substitute URL, or set for some subset of the universal group of substitute URLs. In block 1120, the substitute URL is deleted after the set time period expires. This aging processor may be applied to web pages other than those that are dynamically generated. For instance, a web site administrator may wish to limit the number of substitute URLs that are in use at one time. He may limit the number using the time period approach. Alternatively, he may limit the total number of substitute URLs that are in use in a web site at one time. Once that limit is reached, the list of substitute URLs is pruned. This pruning process may include pruning the oldest substitute URLs as one nonlimiting example. Alternatively, in another nonlimiting example, it may include pruning the least used substitute URLs.

Embodiments of the present disclosure can be implemented in hardware, software, firmware, or a combination thereof. In exemplary embodiments, the substitute URL generator is implemented in software or firmware that is stored in a memory and that is executed by a suitable instruction execution system. If implemented in hardware, as in an alternative embodiment, the substitute URL generator can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow charts show the architecture, functionality, and operation of possible implementations of the substitute URL generation software. In this regard, each block represents a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved, as will be further clarified hereinbelow.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The substitute URL generation program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, the following is claimed:

1. A method for generating a substitute uniform resource locator, the method comprising:

receiving, at a server comprising a processor, from a client device, a request to retrieve a web page at a uniform resource locator corresponding to a tree structure of a web site;

responsive to receiving the request and the uniform resource locator being greater than a defined threshold value of characters in length, automatically generating, by the processor without intervention from the client device, the substitute uniform resource locator for the web page;

sending, by the processor to the client device, the web page and the substitute uniform resource locator causing the substitute uniform resource locator to be displayed within a location bar of a client web browser rendering the web page, wherein the substitute uniform resource locator is reused in response to a subsequent request to retrieve the web page at the uniform resource locator corresponding to the tree structure of the web site;

determining, by the server, a total number of substitute uniform resource locators in use in association with the web site;

determining, by the server, that the total number of substitute uniform resource locators in use in association with the web site exceeds a limit; and in response to determining that the total number of substitute uniform resource locators in use in association with the web site exceeds the limit,
  determining, by the server, a portion of the total number of substitute uniform resource locators to delete based on an amount of use associated with each of the total number of substitute uniform resource locators, and
  deleting, by the server, the portion of the total number of substitute uniform resource locators.

2. The method of claim 1, wherein generating the substitute uniform resource locator comprises selecting the substitute uniform resource locator from a database of available substitute uniform resource locators.

3. The method of claim 1, wherein generating the substitute uniform resource locator comprises generating the substitute uniform resource locator with an algorithm.

4. The method of claim 1, wherein the substitute uniform resource locator includes a domain name of the uniform resource locator as part of the substitute uniform resource locator.

5. The method of claim 1, wherein the substitute uniform resource locator is displayed within an address bar of the client web browser rendering the web page in addition to the location bar.

6. A non-transitory computer readable storage medium storing instructions that, when executed by a processor of a server, cause the processor to perform operations comprising:
  receiving, from a client device, a request to retrieve a web page at a uniform resource locator corresponding to a tree structure of a web site;
  responsive to receiving the request and the uniform resource locator being greater than a defined threshold value of characters in length, automatically generating, without intervention from the client device, a substitute uniform resource locator for the web page;
  sending, to the client device, the web page and the substitute uniform resource locator causing the substitute uniform resource locator to be displayed within a location bar of a client web browser rendering the web page, wherein the substitute uniform resource locator is reused in response to a subsequent request to retrieve the web page at the uniform resource locator corresponding to the tree structure of the web site;
  determining a total number of substitute uniform resource locators in use in association with the web site;
  determining that the total number of substitute uniform resource locators in use in association with the web site exceeds a limit; and
  in response to determining that the total number of substitute uniform resource locators in use in association with the web site exceeds the limit,
    determining a portion of the total number of substitute uniform resource locators to delete based on an amount of use associated with each of the total number of substitute uniform resource locators, and
    deleting the portion of the total number of substitute uniform resource locators.

7. The non-transitory computer readable storage medium of claim 6, wherein generating the substitute uniform resource locator comprises selecting the substitute uniform resource locator from a database of available substitute uniform resource locators.

8. The non-transitory computer readable storage medium of claim 6, wherein generating the substitute uniform resource locator comprises generating the substitute uniform resource locator with an algorithm.

9. The non-transitory computer readable storage medium of claim 6, wherein the substitute uniform resource locator includes a domain name of the uniform resource locator as part of the substitute uniform resource locator.

10. The non-transitory computer readable storage medium of claim 6, wherein the substitute uniform resource locator is displayed within an address bar of the client web browser rendering the web page in addition to the location bar.

11. A system for generating a substitute uniform resource locator, the system comprising:
  a processor; and
  a memory storing instructions that, when executed by the processor, cause the processor to perform operations comprising
    receiving, from a client device, a request to retrieve a web page at a uniform resource locator corresponding to a tree structure of a web site,
    responsive to receiving the request and the uniform resource locator being greater than a defined threshold value of characters in length, automatically generating, without intervention from the client device, the substitute uniform resource locator for the web page,
    sending, to the client device, the web page and the substitute uniform resource locator causing the substitute uniform resource locator to be displayed within a location bar of a client web browser rendering the web page, wherein the substitute uniform resource locator is reused in response to a subsequent request to retrieve the web page at the uniform resource locator corresponding to the tree structure of the web site,
    determining a total number of substitute uniform resource locators in use in association with the web site,
    determining that the total number of substitute uniform resource locators in use in association with the web site exceeds a limit, and
    in response to determining that the total number of substitute uniform resource locators in use in association with the web site exceeds the limit,
      determining a portion of the total number of substitute uniform resource locators to delete based on an amount of use associated with each of the total number of substitute uniform resource locators, and
      deleting the portion of the total number of substitute uniform resource locators.

12. The system of claim 11, wherein generating the substitute uniform resource locator comprises selecting the substitute uniform resource locator from a database of available substitute uniform resource locators.

13. The system of claim 11, wherein generating the substitute uniform resource locator comprises generating the substitute uniform resource locator with an algorithm.

14. The system of claim 11, wherein the substitute uniform resource locator includes a domain name of the uniform resource locator as part of the substitute uniform resource locator.

15. The system of claim 11, wherein the operations further comprise hosting the web page.

16. The system of claim 11, wherein the operations further comprise validating that the uniform resource locator is operable before generating the substitute uniform resource locator.

17. The system of claim 11, wherein the substitute uniform resource locator is displayed within an address bar of the client web browser rendering the web page in addition to the location bar.

18. The method of claim 1, further comprising validating that the uniform resource locator is operable before generating the substitute uniform resource locator.

19. The non-transitory computer readable storage medium of claim 6, wherein the operations further comprise validating that the uniform resource locator is operable before generating the substitute uniform resource locator.

* * * * *